United States Patent
Teagan

(10) Patent No.: US 8,413,771 B2
(45) Date of Patent: Apr. 9, 2013

(54) BRAKE PAD ASSEMBLY

(76) Inventor: Michael Teagan, Waterford, MI (US)

( * ) Notice: Subject to any disclaimer, the term of this patent is extended or adjusted under 35 U.S.C. 154(b) by 0 days.

(21) Appl. No.: 13/160,057

(22) Filed: Jun. 14, 2011

(65) Prior Publication Data

US 2012/0318621 A1    Dec. 20, 2012

(51) Int. Cl.
*F16D 65/10* (2006.01)

(52) U.S. Cl.
USPC .................................. 188/264 R; 188/264 A

(58) Field of Classification Search ............. 188/250 B, 188/250 D, 250 E, 250 G, 251 M, 258, 264 A, 188/264 AA, 264 F, 264 R
See application file for complete search history.

(56) References Cited

U.S. PATENT DOCUMENTS

| | | | | |
|---|---|---|---|---|
| 2,909,244 | A * | 10/1959 | Kraft | 188/29 |
| 3,277,985 | A * | 10/1966 | Caskey | 188/264 AA |
| 3,592,297 | A * | 7/1971 | Leffert | 188/71.6 |
| 7,905,335 | B2 * | 3/2011 | Demers | 188/264 R |
| 2010/0163352 | A1 * | 7/2010 | Umeda | 188/250 B |

* cited by examiner

*Primary Examiner* — Christopher Schwartz
(74) *Attorney, Agent, or Firm* — Gifford, Krass, Sprinkle, Anderson & Citkowski, P.C.

(57) ABSTRACT

A disc brake system for a disc brake having a pair of brake pad backing plates adapted to be movably positioned on opposite sides of a brake disc. A brake pad is attached to each of the backing plates so that the brake pads face the brake disc on opposite sides of the brake disc. At least one of the brake pad backing plates is constructed of a thermally conductive material and includes a portion which extends outwardly from its attached brake pad and includes at least one elongated slot to improve brake cooling.

6 Claims, 1 Drawing Sheet

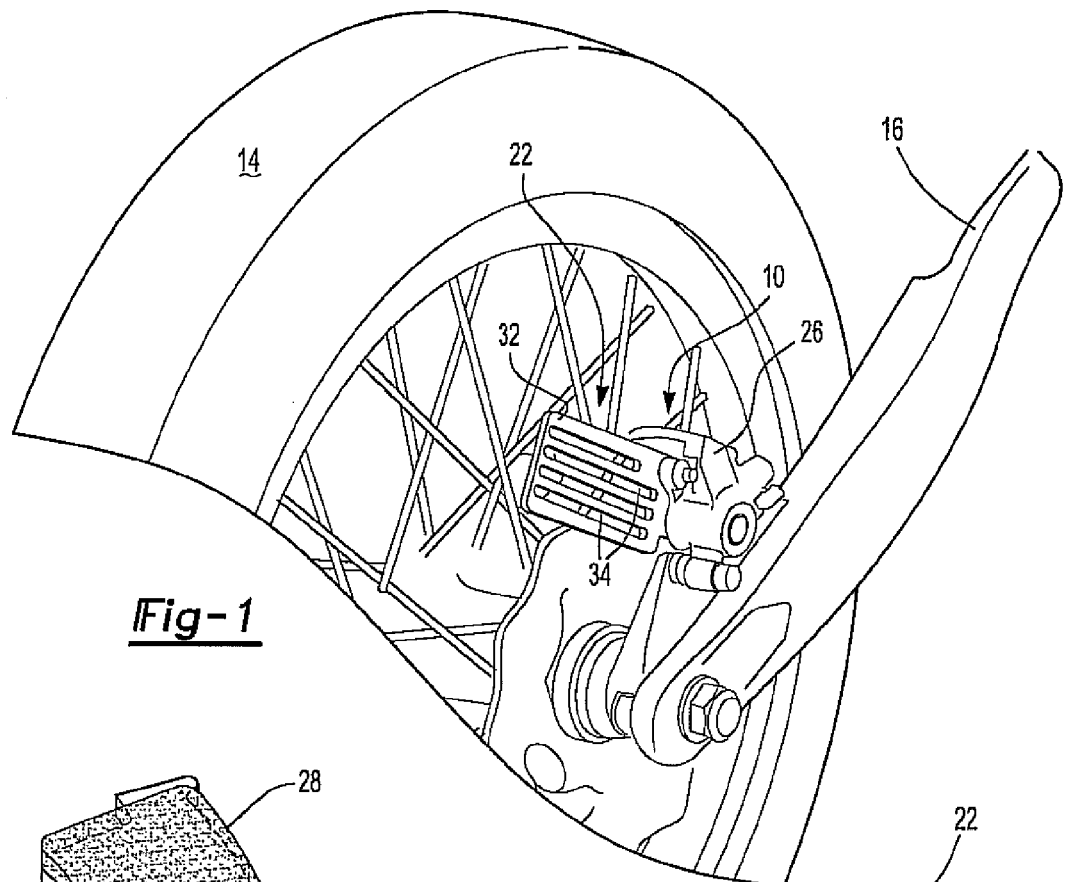
*Fig-1*
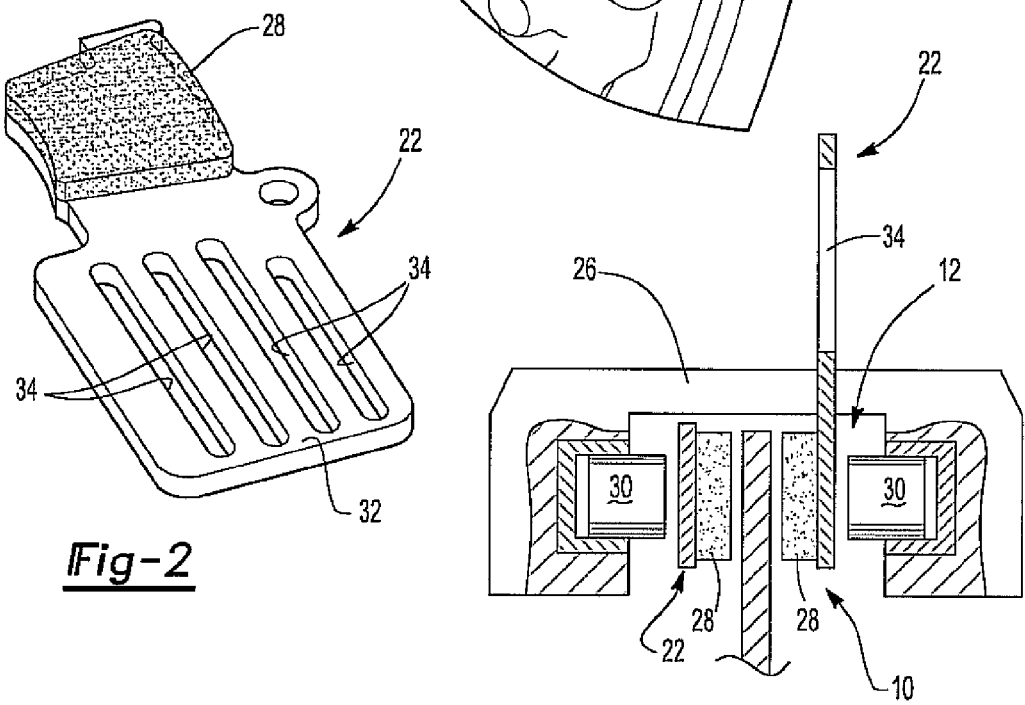
*Fig-2*
*Fig-3*

BRAKE PAD ASSEMBLY

BACKGROUND OF THE INVENTION

I. Field of the Invention

The present invention relates generally to vehicle brakes and, more particularly, to a brake pad assembly for use with a disc brake.

II. Description of Related Art

Many vehicles, such as motorcycles, utilize a disc brake system for slowing the vehicle. In such a disc brake system, a brake disc is attached to and rotates in unison with the vehicle wheel.

A pair of brake pad assemblies are then positioned in a caliper on opposite sides of the brake disc so that brake pads on the brake pad assembly face each other but on opposite sides of the brake disc. The caliper includes a moving mechanism which, under control of the operator, compresses the brake pads against the brake disc to slow the rotation of the brake disc and thus the rotation of the wheel.

Since the brake pads compress against the brake disc during rotation of the brake disc during a braking operation, a large amount of heat is generated from the friction between the brake pads and the brake disc. During heavy or frequent braking operations, the heat generated by the friction between the brake pads and the brake disc can become excessive and result in damage to the brake disc system. Such damage oftentimes necessitates replacement of the disc brake system which is not only time consuming, but expensive.

SUMMARY OF THE PRESENT INVENTION

The present invention provides a brake pad assembly for use with brake discs which overcomes the above-mentioned disadvantages of the previously known brake pad assembly designs.

In brief, the brake pad assembly of the present invention includes a pair of brake pad backing plates which are adapted to be movably positioned by a caliper on opposite sides of a brake disc. One brake pad is attached to each brake pad backing plate so that the brake pads face the brake disc on opposite sides of the brake disc.

At least one of the brake pad backing plates is constructed of a thermally conductive material and includes a portion which extends outwardly from its attached brake pad. This outwardly extending portion of the brake pad backing plate includes at least one elongated slot, and preferably several parallel slots. These slots not only increase the overall area of the brake pad backing plate to improve heat dissipation, but also improve air flow through and across the slots in the brake pad backing plate for improved cooling of the disc brake system.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a preferred embodiment of the present invention installed on a rear tire of a motorcycle;

FIG. 2 is an elevational view illustrating a preferred embodiment of the present invention; and FIG. 3 is a sectional view illustrating the preferred embodiment of the present invention.

DETAILED DESCRIPTION OF A PREFERRED EMBODIMENT OF THE PRESENT INVENTION

With reference first to FIGS. 1 and 3, a disc brake system 10 is shown mounted to the rear wheel 14 of a motorcycle 16. In the conventional fashion, the disc brake system 10 includes a brake disc 20 (FIG. 3) which is attached to the rear wheel 14 and rotates in unison with the rear wheel 14 and a caliper 26 mounted to the motorcycle 16 which encloses part of the brake disc 20.

As best shown in FIGS. 2 and 3, the disc brake system 10 includes a pair of brake pad assemblies 12 and 13, each having a backing plate 22 and 24, respectively, and a brake pad 28. The brake pad assemblies 12 and 13 are mounted within the caliper 26 so that the brake pads 28 face the brake disc 20 on opposite sides of the brake disc 20 and are aligned with each other. Any conventional means may be used to attach the brake pads 28 to their respective backing plates 22 and 24.

In the conventional fashion, an actuator 30, illustrated only diagrammatically in FIG. 3, is associated with each brake pad assembly 12 and 13. These actuators 30, under control of the operator of the vehicle, compress the brake pads 28 against the brake disc 20 during a braking operation thus slowing the motorcycle or other vehicle. In the well-known fashion, heat is generated by friction during a braking operation due to the friction between the brake pads 28 and the brake disc 20.

With reference now particularly to FIGS. 2 and 3, the brake pad backing plate 22 is generally planar and constructed of metal, preferably copper. As such, the backing plate 22 exhibits high thermal conductivity.

Still referring to FIGS. 2 and 3, the backing plate 22 includes a portion 32 which extends laterally outwardly from its attached brake pad 28. Furthermore, the area of the outwardly protruding portion 32 of the backing plate 22 is preferably at least twice the size in area as the area of the brake pad 28.

At least one, and preferably a plurality of elongated slots 34 are formed through the outwardly extending portion 32 of the backing plate 22. Preferably, these slots 34 are parallel to each other and serve several purposes.

First, the slots 34 effectively increase the overall area of the outwardly extending portion 32 of the backing plate 22. This, in turn, increases the thermal dissipation of heat from the backing plate 22 due to the increased area.

The slots 34 also allow air flow through the slots 34 thus further increasing the heat dissipation due to convection. This, in turn, increases the heat dissipation of the backing plate 22.

Lastly, the slots 34 reduce both the overall weight and metal content of the backing plate 22 which reduces the overall material cost of the brake pad assembly.

From the foregoing, it can be seen that the present invention provides an improved brake pad assembly for use with a motorcycle disc brake system, as well as other vehicles, which greatly enhances heat dissipation from the brake system during a braking operation. Having described my invention, however, many modifications thereto will become apparent to those skilled in the art to which it pertains without deviation from the spirit of the invention as defined by the scope of the appended claims.

I claim:

1. A disc brake system for use with a vehicle comprising:
a pair of planar brake pad backing plates adapted to be movably positioned on opposite sides of a planar brake disc,
a pair of brake pads, one brake pad attached to each brake pad backing plate so that said brake pads face the brake disc on opposite sides of the brake disc,
wherein at least one of said brake pad backing plates is constructed of a thermally conductive material and includes a portion which extends outwardly from its attached brake pad, said outwardly extending portion of said at least one brake pad backing plate including at least one elongated slot extending entirely through said at least one brake pad backing plate in a direction generally perpendicular to a plane of the brake disc.

2. The system as defined in claim 1 wherein said at least one brake pad backing plate includes a plurality of elongated through slots.

3. The system as defined in claim 2 wherein said plurality of elongated through slots in said at least one brake pad backing plate are generally parallel to each other.

4. The system as defined in claim 1 wherein said brake pad backing plates are constructed of metal.

5. The system as defined in claim 4 wherein said metal comprises copper.

6. The system as defined in claim 1 wherein the area of said outwardly extending portion of said at least one brake pad backing plate is at least twice the area of its attached brake pad.

\* \* \* \* \*